United States Patent
Takano et al.

(10) Patent No.: US 11,307,359 B2
(45) Date of Patent: Apr. 19, 2022

(54) INGRESS PROTECTED, OUTDOOR RATED CONNECTOR WITH INTEGRATED OPTICAL CONNECTOR PLUG FRAME

(71) Applicant: Senko Advanced Components, Inc., Marlborough, MA (US)

(72) Inventors: Kazuyoshi Takano, Tokyo (JP); Jeffrey Gniadek, Oxford, ME (US); George Wakileh, Aurora, IL (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/782,828

(22) Filed: Feb. 5, 2020

(65) Prior Publication Data

US 2020/0257060 A1    Aug. 13, 2020

Related U.S. Application Data

(60) Provisional application No. 62/802,635, filed on Feb. 7, 2019.

(51) Int. Cl.
*G02B 6/38* (2006.01)
*G02B 6/42* (2006.01)

(52) U.S. Cl.
CPC .......... *G02B 6/3849* (2013.01); *G02B 6/381* (2013.01); *G02B 6/423* (2013.01)

(58) Field of Classification Search
CPC ....... G02B 6/3849; G02B 6/423; G02B 6/381
See application file for complete search history.

(56) References Cited

U.S. PATENT DOCUMENTS

| | | | |
|---|---|---|---|
| 6,116,790 | A | 9/2000 | Vergeest |
| 6,409,393 | B1 | 6/2002 | Grois et al. |
| 6,542,674 | B1 | 4/2003 | Gimblet |
| 6,546,175 | B1 | 4/2003 | Wagman |
| 6,585,423 | B1 | 7/2003 | Vergeest |
| 6,648,520 | B2 | 11/2003 | McDonald |
| 6,714,710 | B2 | 3/2004 | Gimblet |
| 6,785,450 | B2 | 8/2004 | Wagman |
| 6,899,467 | B2 | 5/2005 | McDonald |
| 6,908,233 | B2 | 6/2005 | Nakajima et al. |
| 7,001,079 | B2 | 2/2006 | Vergeest |
| 7,090,406 | B2 | 8/2006 | Melton |
| 7,090,407 | B2 | 8/2006 | Melton |
| 7,111,990 | B2 | 9/2006 | Melton |
| 7,113,679 | B2 | 9/2006 | Melton |

(Continued)

FOREIGN PATENT DOCUMENTS

| WO | WO2010039830 A2 | 4/2010 |
|---|---|---|
| WO | WO2010039830 A3 | 6/2010 |

(Continued)

OTHER PUBLICATIONS

International Search Report & Written Opinion for PCT Application Mo. PCT/US2020/017163, dated Jun. 10, 2020.

*Primary Examiner* — Andrew Jordan

(57) ABSTRACT

An outdoor rated ingress protected ruggedize connector with molded inner body configured with a plug frame to accept a ferrule. A ferrule assembly has a flange that accepts one or more alignment members formed as part of the inner body. The alignment members and align the ferrule assembly under the force of a bias spring supported by a spring push integrated into a back body.

17 Claims, 11 Drawing Sheets

(56) References Cited

U.S. PATENT DOCUMENTS

| | | |
|---|---|---|
| 7,118,283 B2 | 10/2006 | Nakajima et al. |
| 7,121,734 B2 | 10/2006 | Taira |
| 7,226,215 B2 | 6/2007 | Bareel et al. |
| 7,234,875 B2 | 6/2007 | Krowiak |
| 7,241,056 B1 | 7/2007 | Kuffel |
| 7,264,402 B2 | 9/2007 | Theuerkom |
| 7,281,856 B2 | 10/2007 | Grzegorzewska |
| 7,344,317 B2 | 3/2008 | Krowiak |
| 7,429,136 B2 | 9/2008 | Lewallen |
| 7,467,896 B2 | 12/2008 | Melton |
| 7,476,035 B2 | 1/2009 | Cull et al. |
| 7,539,380 B1 | 5/2009 | Abernathy et al. |
| 7,559,700 B2 | 7/2009 | Eguchi et al. |
| 7,567,741 B2 | 7/2009 | Abernathy et al. |
| 7,572,065 B2 | 8/2009 | Lu |
| 7,654,747 B2 | 2/2010 | Theuerkom |
| 7,654,748 B2 | 2/2010 | Kuffel |
| 7,744,286 B2 | 6/2010 | Lu |
| 7,744,288 B2 | 6/2010 | Lu |
| 7,762,726 B2 | 7/2010 | Lu |
| 7,785,015 B2 | 8/2010 | Melton |
| 7,785,019 B2 | 8/2010 | Lewallen |
| 7,796,853 B2 | 9/2010 | Abernathy et al. |
| 7,881,576 B2 | 2/2011 | Melton |
| 7,891,882 B2 | 2/2011 | Kuffel |
| 7,918,609 B2 | 4/2011 | Melton |
| 7,942,590 B2 | 5/2011 | Lu |
| 7,959,361 B2 | 6/2011 | Lu |
| 8,052,333 B2 | 11/2011 | Kuffel |
| 8,202,008 B2 | 6/2012 | Lu |
| 8,231,282 B2 | 7/2012 | Kuffel |
| 8,297,850 B2 | 10/2012 | Nishioka |
| 8,348,519 B2 | 1/2013 | Kuffel |
| 8,414,196 B2 | 4/2013 | Lu |
| 8,496,384 B2 | 7/2013 | Kuffel |
| 8,506,173 B2 | 8/2013 | Lewallen et al. |
| 8,573,859 B2 | 11/2013 | Larson |
| 8,672,560 B2 | 3/2014 | Haley |
| 8,699,467 B2 | 4/2014 | Lindoff |
| 8,714,835 B2 | 5/2014 | Kuffel |
| 8,770,862 B2 | 7/2014 | Lu |
| 8,814,441 B2 | 8/2014 | Strasser et al. |
| 8,840,320 B2 | 9/2014 | Park |
| 8,939,654 B2 | 1/2015 | Lu |
| 9,103,995 B2 | 8/2015 | Park |
| 9,239,441 B2 | 1/2016 | Melton |
| 9,291,780 B2 | 3/2016 | Lu |
| 9,304,262 B2 | 4/2016 | Lu |
| 9,310,570 B2 | 4/2016 | Busse |
| 9,397,441 B2 | 7/2016 | Sun |
| 9,442,257 B2 | 9/2016 | Lu |
| 9,482,829 B2 | 11/2016 | Lu |
| 9,519,114 B2 | 12/2016 | Zimmel |
| 9,535,230 B2 | 1/2017 | Newbury |
| 9,664,862 B2 | 5/2017 | Lu |
| 9,684,138 B2 | 6/2017 | Lu |
| 9,733,436 B2 | 8/2017 | Van Baelen et al. |
| 9,739,951 B2 | 8/2017 | Busse |
| 9,854,151 B2 | 12/2017 | Endo |
| 9,964,715 B2 | 5/2018 | Lu |
| 9,983,366 B2 | 5/2018 | Bund |
| 10,012,802 B2 | 7/2018 | Newbury |
| 10,101,538 B2 | 10/2018 | Lu |
| 10,114,176 B2 | 10/2018 | Gimblet |
| 10,146,015 B2 | 12/2018 | Zimmel |
| 10,162,126 B2 | 12/2018 | Elenbaas |
| 10,162,215 B2 | 12/2018 | Chen et al. |
| 10,180,541 B2 | 1/2019 | Coenegracht |
| 10,197,739 B2 | 2/2019 | Ohtsuka |
| 10,234,641 B2 | 3/2019 | Hill |
| 10,317,628 B2 | 6/2019 | Van Baelen |
| 10,338,323 B2 | 7/2019 | Lu |
| 10,401,578 B2 | 9/2019 | Coenegracht |
| 10,451,811 B2 | 10/2019 | Coenegracht |
| 10,473,866 B2 | 11/2019 | Newbury |
| 10,502,907 B2 | 12/2019 | Wang |
| 10,613,278 B2 | 4/2020 | Kempeneers et al. |
| 2006/0018604 A1* | 1/2006 | Bareel .................. G02B 6/3821 |
| | | 385/78 |
| 2006/0045428 A1 | 3/2006 | Theuerkom |
| 2008/0273855 A1 | 11/2008 | Bradley |
| 2009/0257717 A1 | 10/2009 | Liu |
| 2010/0329267 A1 | 12/2010 | Sakamoto |
| 2011/0222826 A1 | 9/2011 | Blackburn |
| 2013/0136398 A1 | 5/2013 | Isenhour |
| 2016/0209599 A1* | 7/2016 | Van Baelen ......... G02B 6/3831 |
| 2017/0227719 A1 | 8/2017 | Zimmel |
| 2018/0081127 A1 | 3/2018 | Coenegracht |
| 2018/0224610 A1 | 8/2018 | Pimentel |
| 2018/0231720 A1 | 8/2018 | Lu |
| 2018/0329157 A1 | 11/2018 | Crawford et al. |
| 2018/0335580 A1 | 11/2018 | Lohse et al. |
| 2019/0107667 A1 | 4/2019 | Huang |
| 2019/0107677 A1 | 4/2019 | Coenegracht |
| 2019/0146161 A1 | 5/2019 | Elenbaas |
| 2019/0179088 A1 | 6/2019 | Zimmel |
| 2019/0235177 A1 | 8/2019 | Lu |
| 2019/0302389 A1 | 10/2019 | Newbury |
| 2019/0324217 A1 | 10/2019 | Lu |
| 2019/0369336 A1 | 12/2019 | Van Baelen |
| 2020/0003965 A1 | 1/2020 | Coenegracht |
| 2020/0012051 A1 | 1/2020 | Coenegracht |
| 2020/0241218 A1 | 7/2020 | Kempeneers et al. |
| 2020/0257060 A1* | 8/2020 | Takano .................. G02B 6/423 |

FOREIGN PATENT DOCUMENTS

| | | |
|---|---|---|
| WO | WO2016073273 A2 | 5/2016 |
| WO | WO2016073273 A3 | 6/2016 |
| WO | WO2018157115 A1 | 8/2018 |
| WO | WO2019173350 A1 | 9/2019 |

* cited by examiner

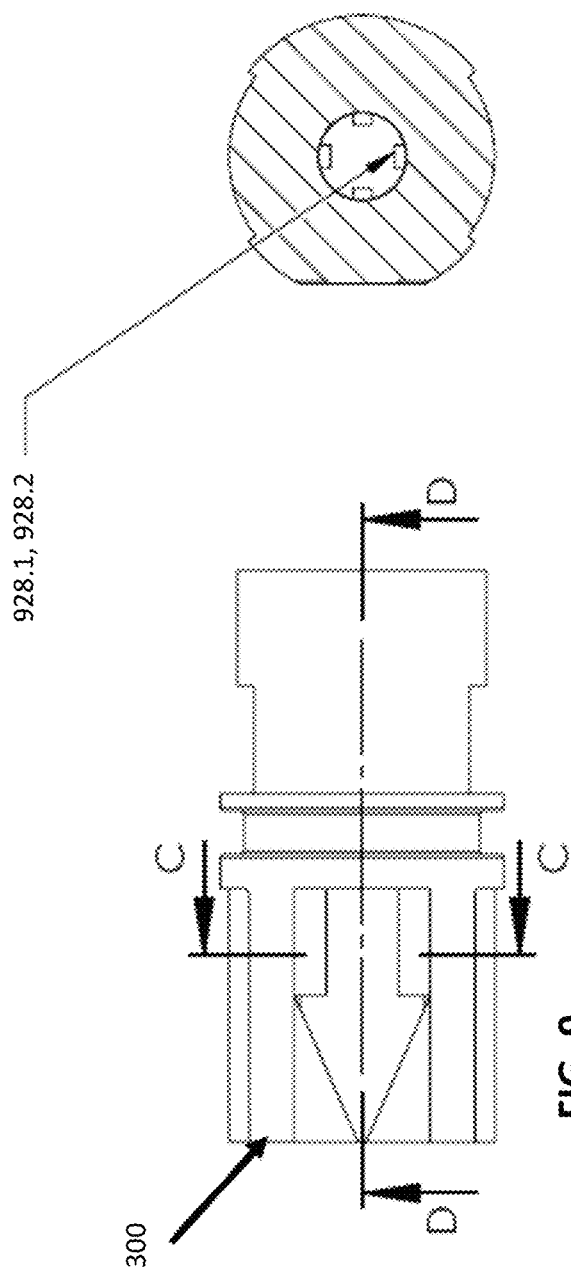
FIG. 9
FIG. 9A
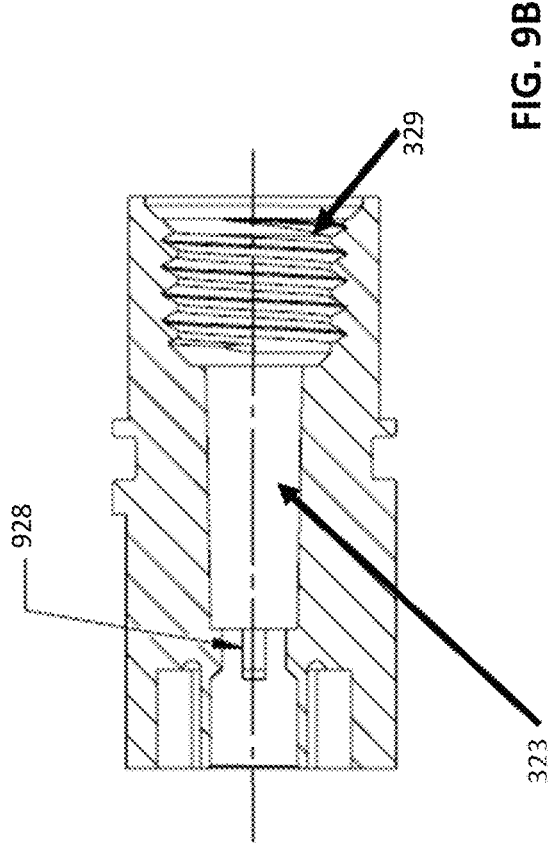
FIG. 9B

US 11,307,359 B2

INGRESS PROTECTED, OUTDOOR RATED CONNECTOR WITH INTEGRATED OPTICAL CONNECTOR PLUG FRAME

CROSS REFERENCE TO RELATED APPLICATIONS

This is the nonprovisional application of U.S. Application Ser. No. 62/802,635, filed Feb. 7, 2019, entitled INGRESS PROTECTED, OUTDOOR RATED CONNECTOR WITH INTEGRATED OPTICAL CONNECTOR PLUG FRAME, the entire contents of which are incorporated herein by reference.

FIELD OF THE INVENTION

The present disclosure relates generally to fiber optic connectors and systems, and specifically to optical fiber field terminated outdoor rated connectors ingress protected from moisture and debris.

BACKGROUND

The reliability of communication infrastructure depends on secure connections between components, such as cable segments, network equipment, and communication devices. Such connections are continually exposed to dust, dirt, moisture, and/or other contaminants that may infiltrate the connections and degrade performance or even sever the connection between components. Conventional connection assemblies, such as typical fiber optic connectors, are generally not capable of providing an adequate seal to fully prevent the ingress of unwanted fluids (for instance, water) or solid contaminants. Fiber optic network segments are particularly vulnerable because fiber optic connections require extremely precise termination and alignment between connected components and cable segments that may be disrupted by the presence of fluid or solid contaminants. As such, fiber optic network segments connected using conventional technology are very susceptible to performance and/or availability degradation over time. Accordingly, telecommunication network providers would benefit from a connection assembly capable of maintaining a sealable and secure connection configured to prevent the ingress of unwanted materials into the connection assembly with a reduced number of parts.

BRIEF DESCRIPTION OF THE DRAWINGS

FIG. 5A is an enlarged fragment of the longitudinal section of FIG. 5;

FIG. 9 is a side view of the ruggedized connector body depicting cross-section D-D and C-C.

FIG. 9A is a cross-section view along line C-C of FIG. 9.

FIG. 9B is a cross-section view along line D-D of FIG. 9.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Figure 1:
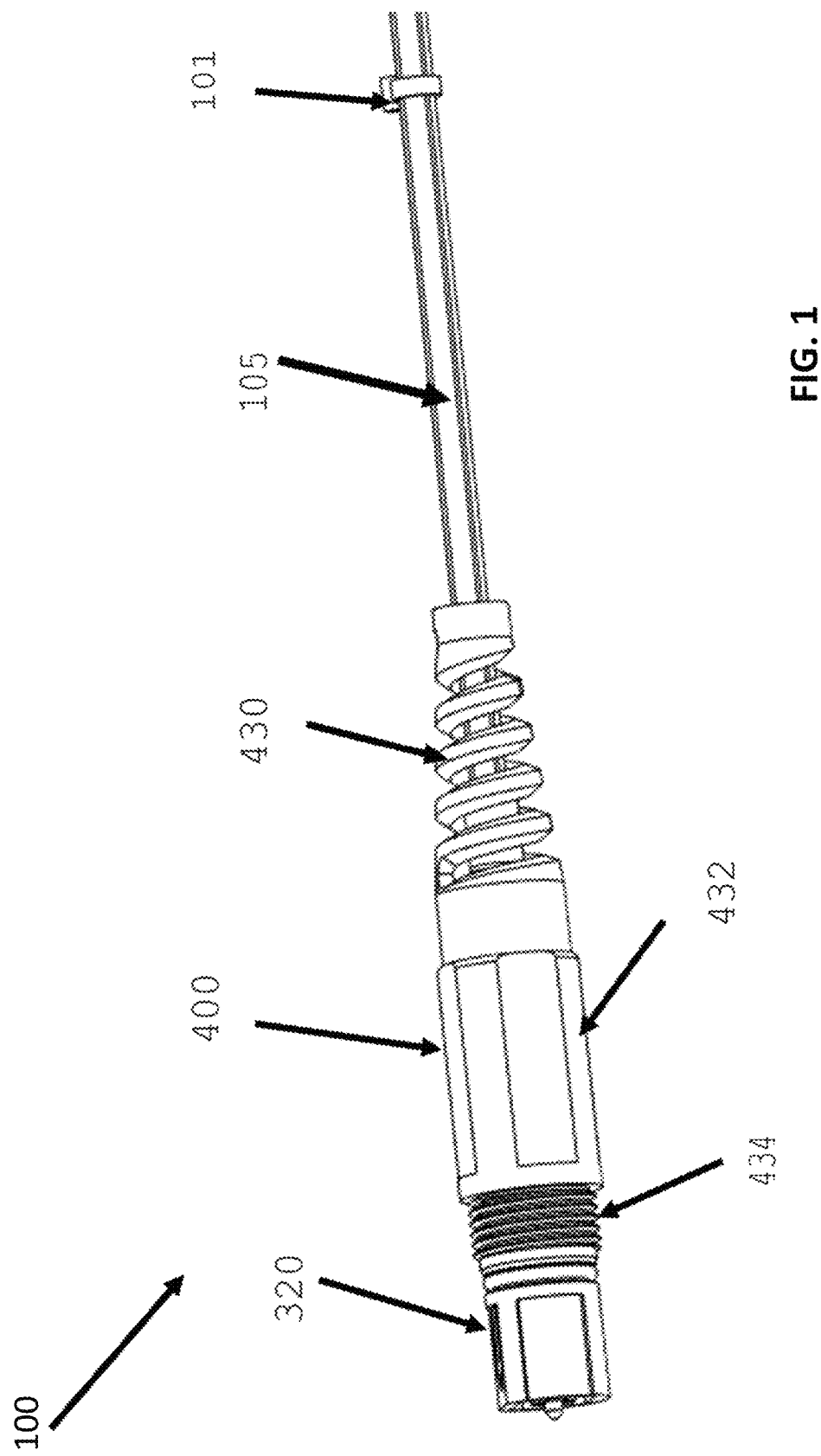
FIG. 1 is a perspective view of an ingress protected connector with a movable outer coupling nut.

FIG. 1 depicts side view of the ingress protected, ruggedized outdoor connector assembly (100) according to the present invention. A proximal end of front body portion (320) of ruggedized outdoor connector (300) is secured to a suitable mating element such as an adapter or receptacle interface to make an optical connection between a signal provided by an optical fiber within ferrule (510) and a corresponding optical fiber within the adapter (not shown). At a second end or distal end of ruggedized outdoor connector (300) is back portion (325) over which coupling nut (400) is accepted. Coupling nut (400) has a threaded collar (434) that secures connector assembly (100) in adapter. Coupling nut main body (432) may be integrated with cable strain relief boot (430). Strain relief boot (430) may be removed and cable (105) can be secured with a crimp ring (not shown). Cable tie wrap (101) is position beyond cable (105) on cable (105). Wrap (101) helps prevent coupling nut (400) from sliding down cable (105) beyond a user defined distance along cable (105). During install, use would insert proximal end of ruggedized connector (300) into adapter receptacle, and then move coupling nut (400) into position and thread with corresponding receiving surface within adapter receptacle. It is important to have the coupling nut (400) near connector (300) to facilitate install.

Figure 2:
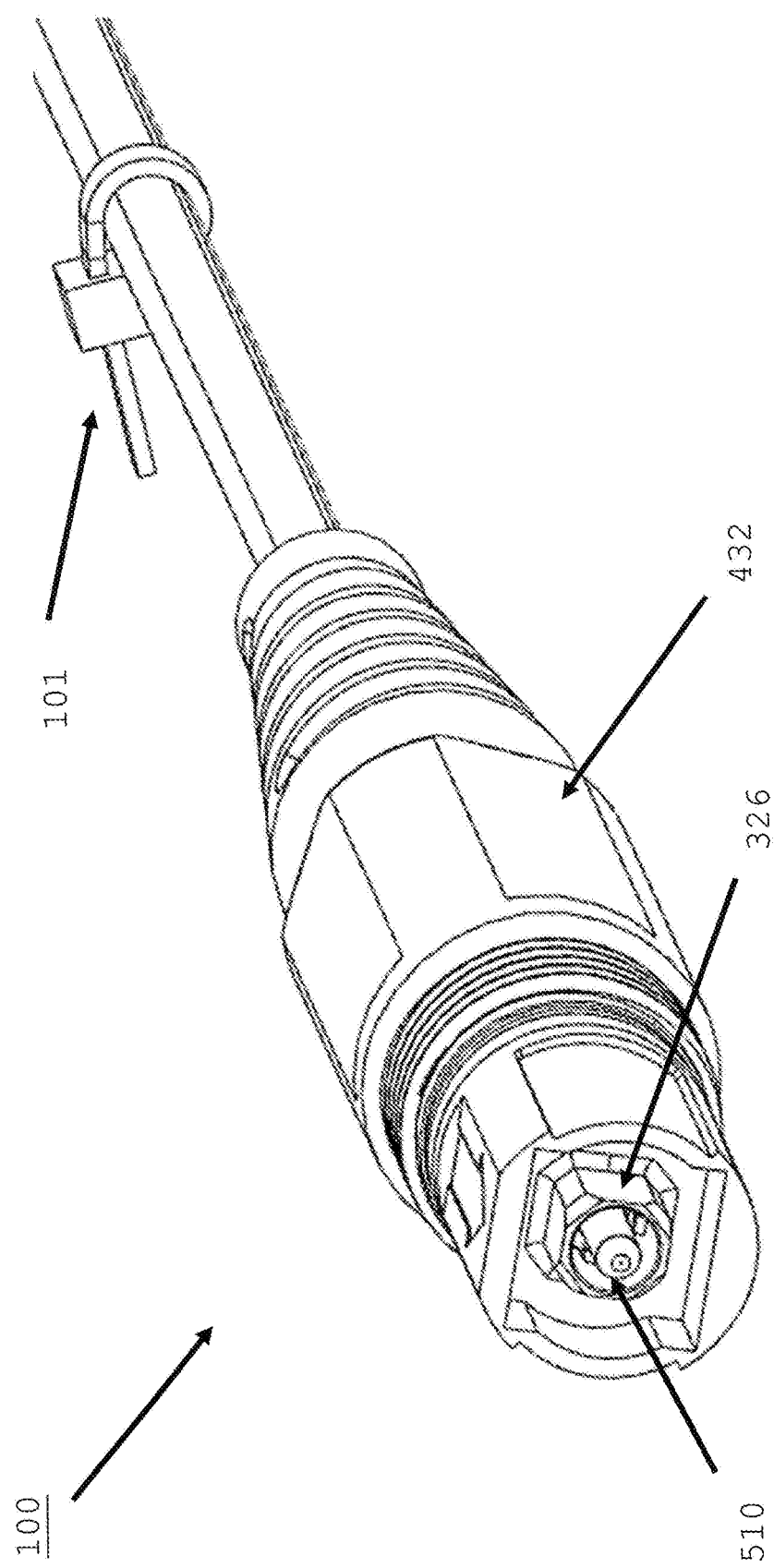
FIG. 2 is a front perspective view of the FIG. 1 connector.

FIG. 2 depicts a front view of FIG. 1. Connector assembly (100) further comprises a plug frame (326) and ferrule (510) contained within plug frame (326). Plug frame (326) is integrally molded as part of an inner surface of connector (300).

Figure 3:
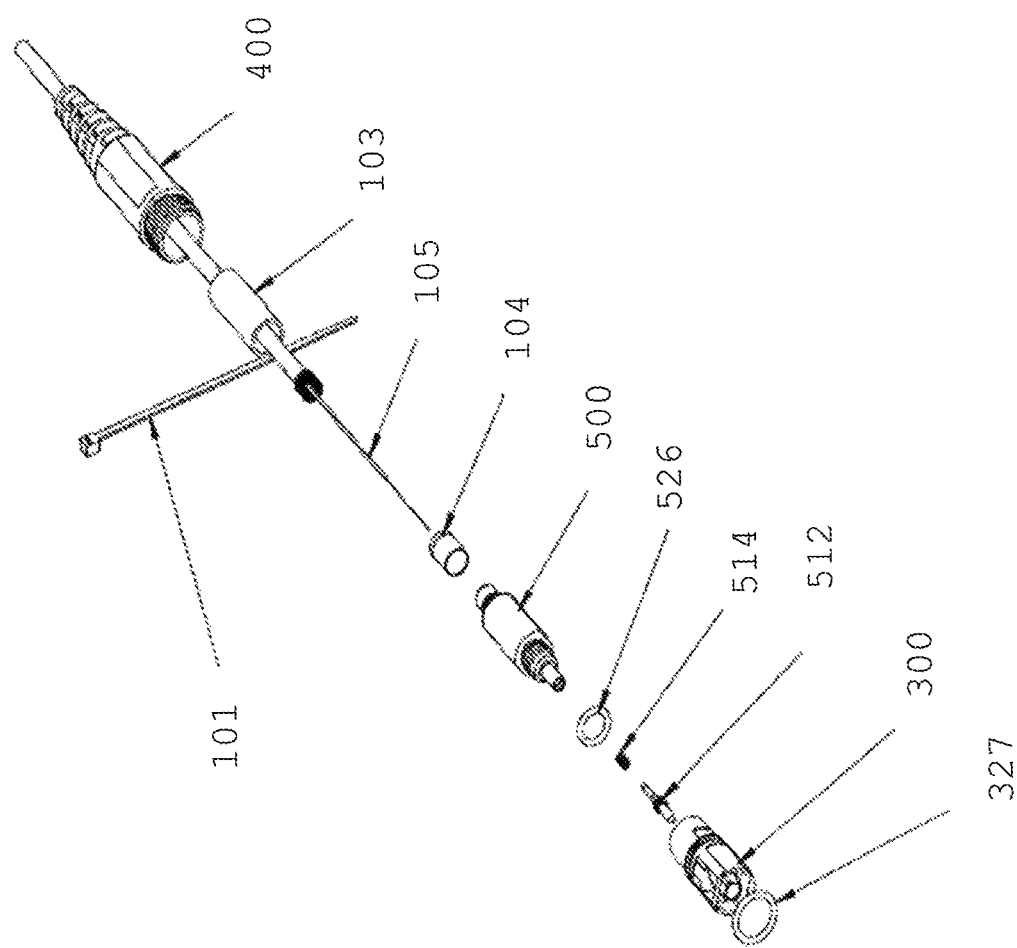
FIG. 3 is an exploded perspective view of the connector of FIG. 1.
Figure 6:
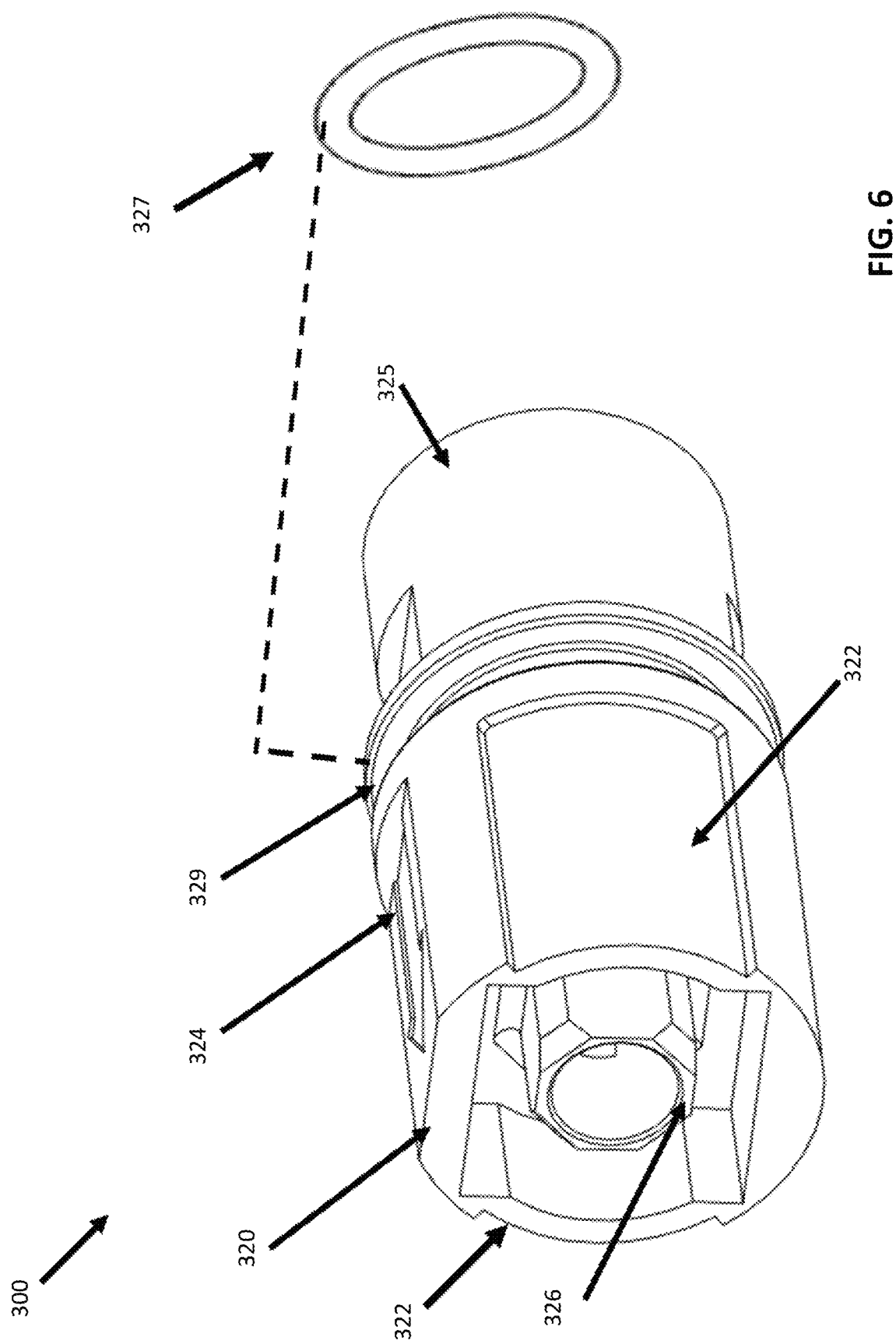
FIG. 6 is a perspective view of a ruggedized connector body with a sealing ring exploded therefrom.

FIG. 3 depicts an exploded view of FIG. 1. Connector assembly (100) is environmentally sealed or protected against an ingress of water, debris and other material that might interfere with proper operation of connector assembly (100) when positioned on a telephone pole, or tower, or on an exposed structure. A pair of O-rings or environmental seals are positioned to protect an inner cavity of ruggedized connector (300). Connector assembly (100) is assembled in direction of arrow "A". Proximal O-ring (327) is positioned in a groove 329 (as shown in FIG. 6). A distal O-ring (526) provides a seal between ruggedized connector back body (500) and distal end of ruggedized connector outer body (300). A double flanged (or ringed) ferrule assembly (512) is inserted into ruggedized connector outer body (300) at a distal end thereof, with a bias spring (514) under a compressive force provided by a spring push (524) (refer to FIG. 11), when ruggedized back body is secured into distal end of connector outer body (300). Crimp ring (104) is secured to distal end of ruggedized connector back body (500), and ring (104) secures cable (105) via its cable jacket or internal strength members or Kevlar strands between ring (104) and back post of back body (500). To complete the environmental seal, heat shrink tubing (103) is placed over crimp ring (104) and a portion of cable (105). Coupling nut (400) is free to move proximal or forward along connector outer body (300) and distal or read along connector outer body until nut (400) is stopped by cable tie wrap (101).

Figure 4:
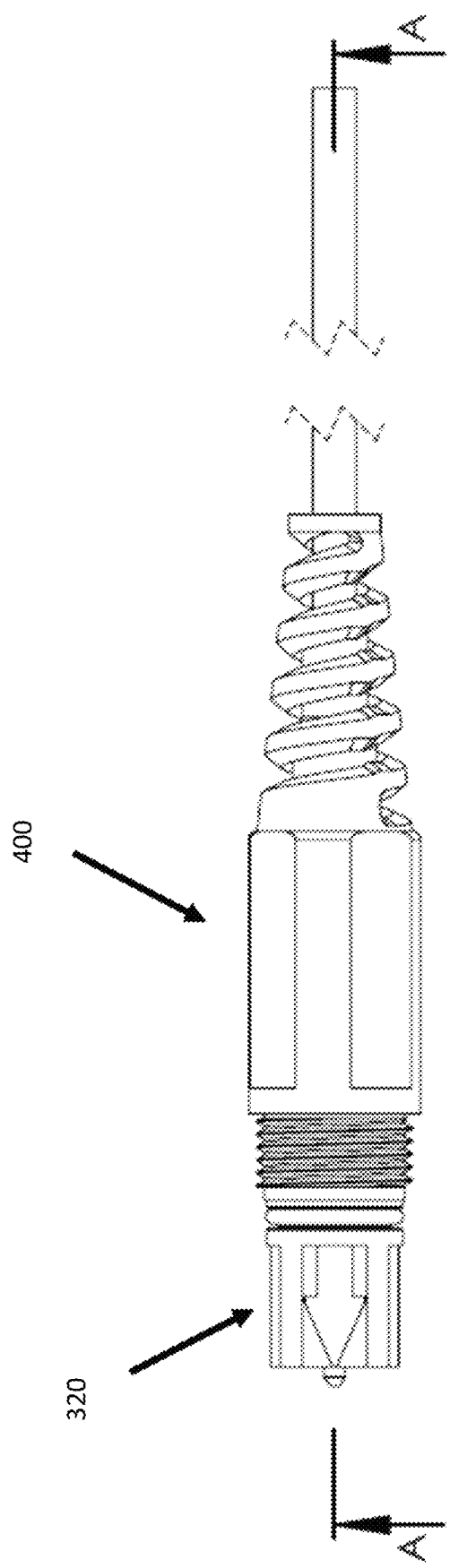
FIG. 4 is a side view of the assembled connector of FIG. 1.
Figure 5:
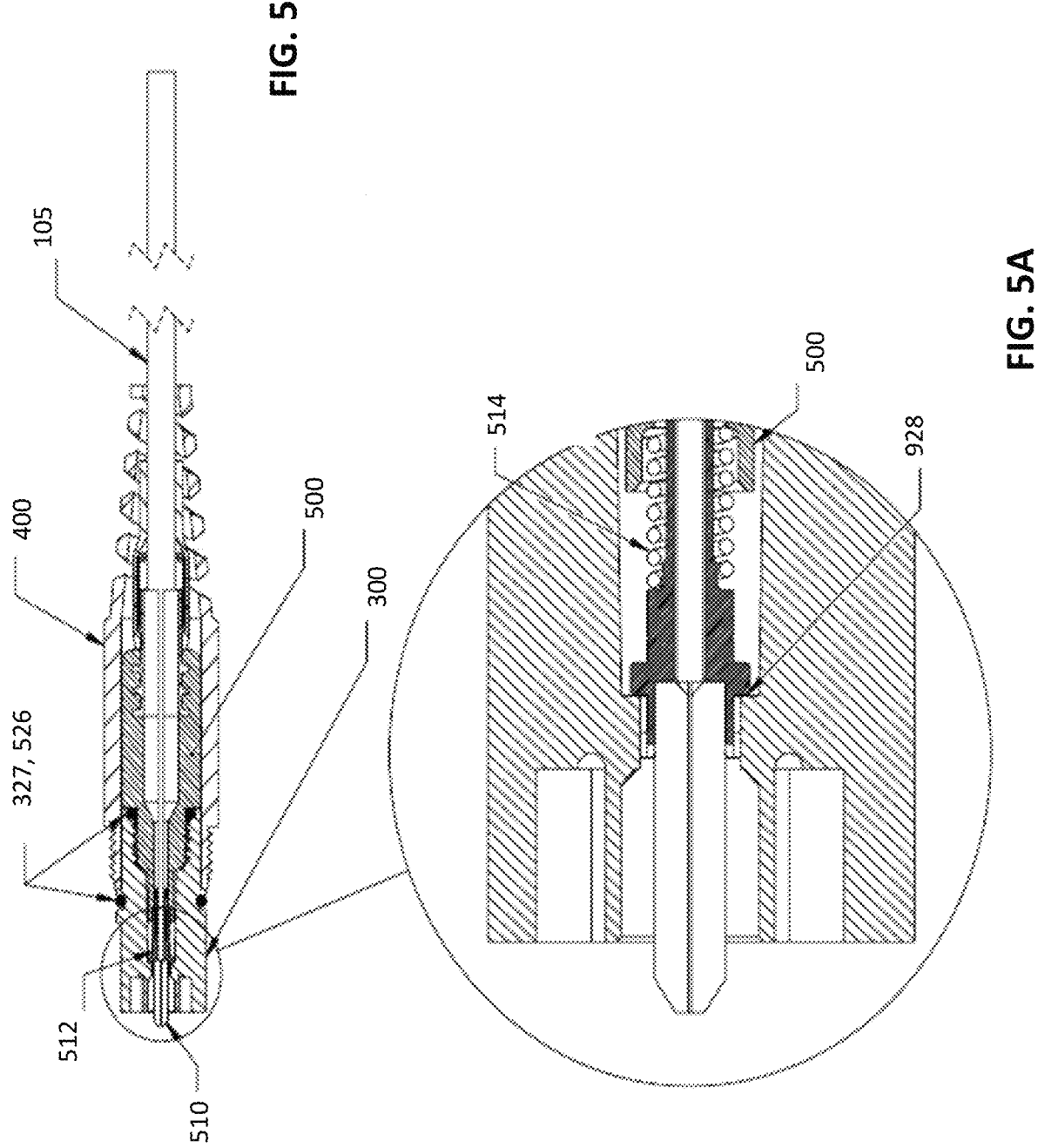
FIG. 5 is a longitudinal section of the connector of FIG. 4 taken in a plane including line A-A'.

FIG. 4 depicts a side view of connector assembly (100). Front portion (320) and coupling nut (400) are assembled forming connector assembly (100). FIG. 5 depicts longitudinal section view along line A-A of FIG. 4. Ferrule assembly (512), with ferrule (510), is biased forward under force of spring (514) received in the ruggedized back body (500). The portion of the ferrule assembly (512) that receives the ferrule (510) may also be referred to as a "body." O-rings (327, 526) show environmental seal points. FIG. 5A is a zoomed view of proximal or forward end of connector assembly (100) depicting compression of ferrule bias spring (514) between back annular ferrule flange (or ring) (512.1) and proximal end of integrated spring push (524) (refer to FIG. 11) at proximal end of ruggedized connector back body (500). Front flange (or ring) (512.2) is retained in position by one or more inner alignment keys (928) (refer to (FIG. 9A) formed as part of an inner surface of ruggedized connector outer body (300).

FIG. 6 depicts a side view of ruggedized connector outer body (300). Front portion (320) comprises a pair of opposing cut-outs or flats (322), and a directional indicator (324). The flats (322) aid in orienting connector assembly (100) into an adapter, then coupling nut (400) is slide forward or proximal to secure connector assembly (100) with adapter by threading (434) into a corresponding receiving surface within the adapter. When coupling nut (400) is slide forward, it seals against O-ring (327) to form an environmental sealing surface. Integrated plug frame (326) accepts a corresponding fiber optic connector with the adapter to form a communication path.

Figure 7:
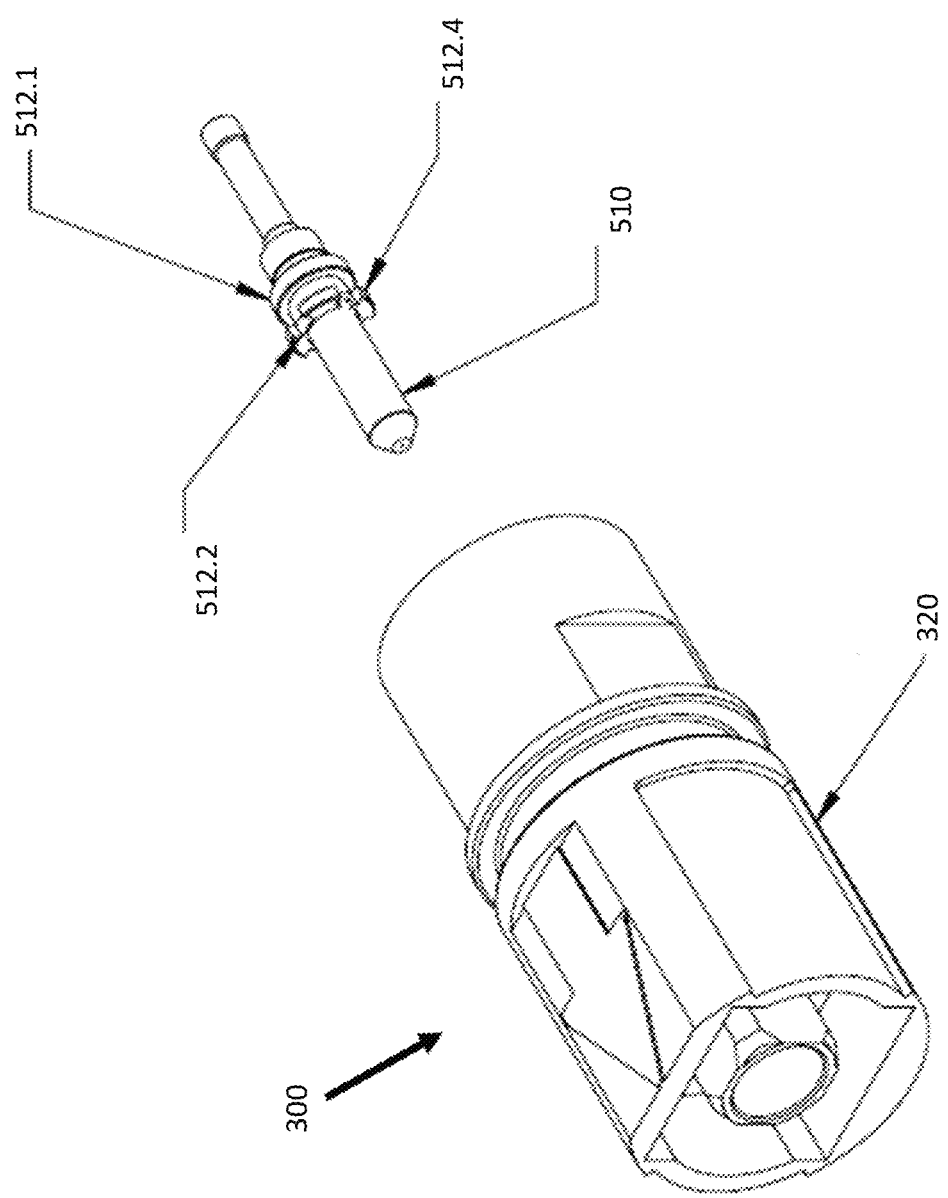
FIG. 7 is a perspective view of a ruggedized connector body with a double ringed ferrule assembly exploded therefrom.
Figure 8:
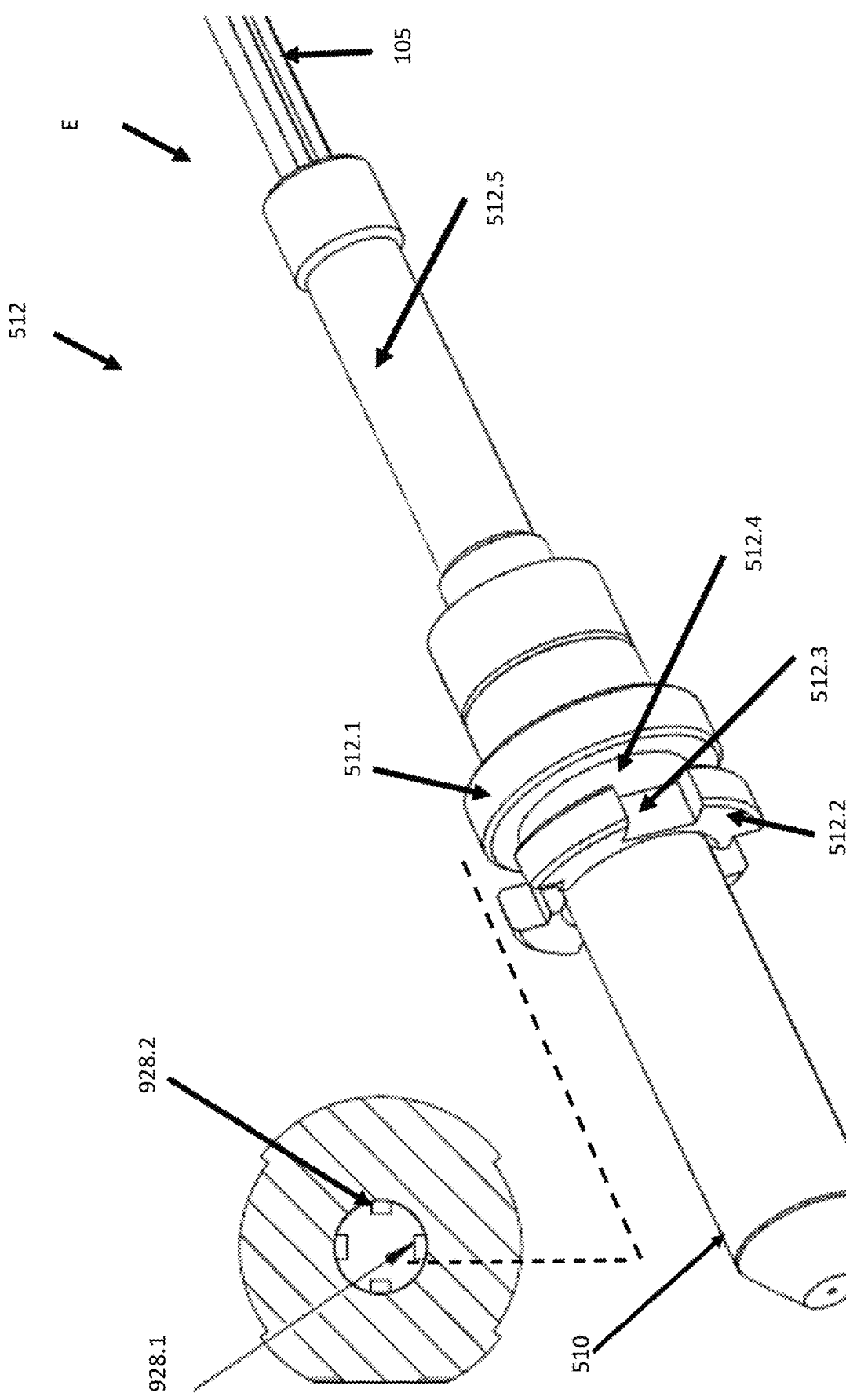
FIG. 8 is an enlarged, perspective view of a double ringed ferrule assembly and insertion point within outer connector body along dotted lines.

FIG. 7 depicts an exploded view of ruggedized connector outer body (300) accepting ferrule assembly (512) in direction of arrow "I". Ferrule assembly (512) is discussed at FIG. 8. FIG. 8 depicts ferrule assembly (512) with front flange (or ring) (512.2) and back annular flange (512.1), and extended body portion (512.5) called an alignment tube. Tube (512.5) receives cable (105) therein and epoxy "E" that when hardened further secures cable (105). Front flange (512.2) has a plurality of alignment notches (512.3) (broadly, "second alignment members") for accepting keys (928) (broadly, "first alignment members") associated with the ruggedized connector outer body (300). Gap (512.4) accepts a portion of key (928) along its longitudinal axis for securing ferrule assembly within the cavity of outer body (300). Spring push (524) formed integrally with connector back body (500) has an opening that accepts alignment tube therein, and biases spring (514) forward which pushes ferrule assembly forward. Keys (e.g., keys 928.1, 928.2, etc.) are back stopped against back annular flange (512.1).

FIG. 9 depicts ruggedized connector outer body (300). FIG. 9A is cross-section along line C-C depicting alignment keys (928) integrally molded as part of connector outer body (300) inner surface. FIG. 9B is cross-section along line D-D also depicting alignment keys (928), distal, inner thread (329) of outer body (300) and cavity (323) forming inner surface of outer body (300).

Figure 10:
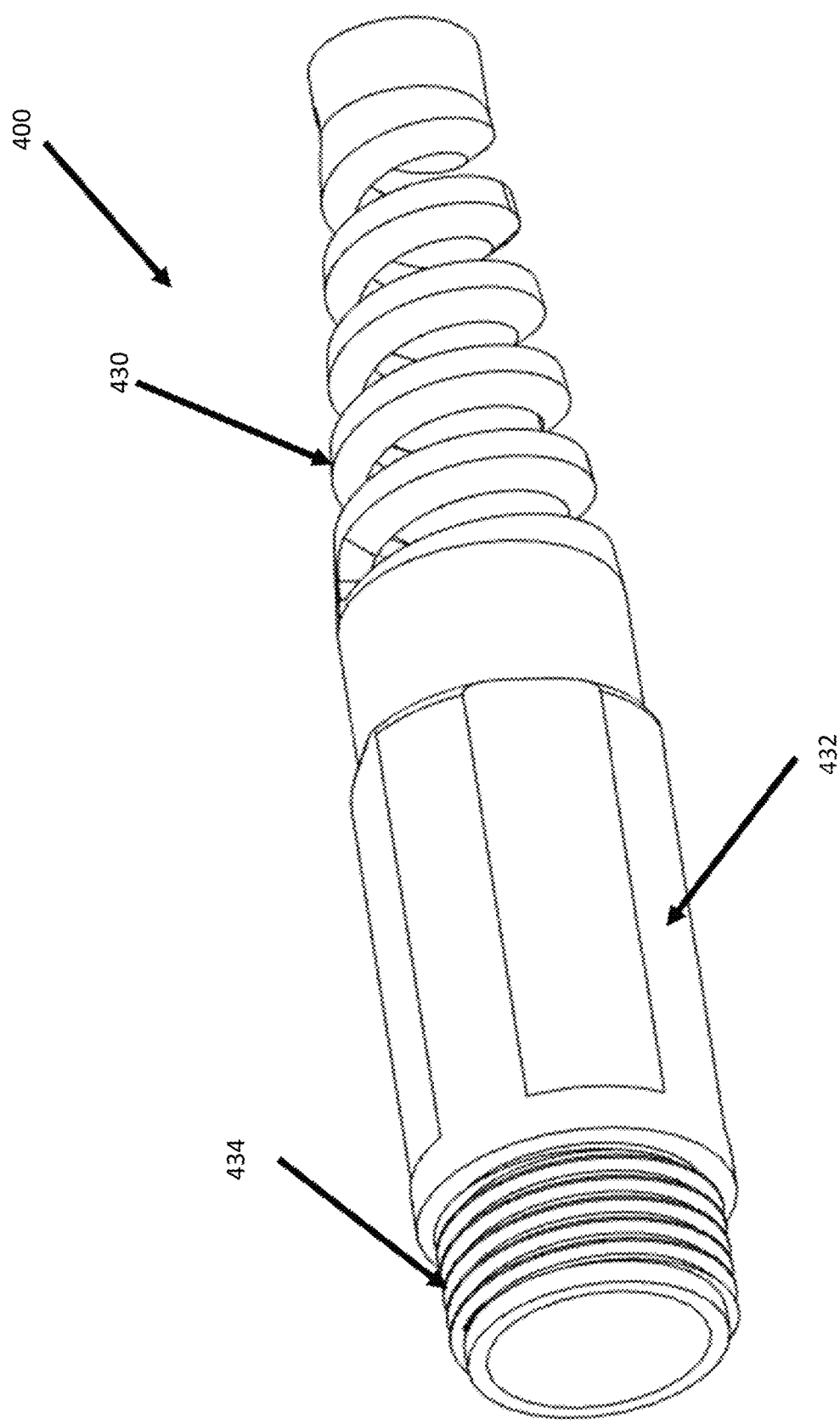
FIG. 10 is a perspective view of coupling nut with strain relief.

FIG. 10 depicts coupling nut (400) with strain relief. Proximal thread (434) secures connector assembly (100) into adapter (not shown). Body (432) provides protection for ruggedized connector back body (500) with spring push (524), and a strain relief boot (430), that directs unwanted pull force on cable (105) away from ferrule assembly (512).

Figure 11:
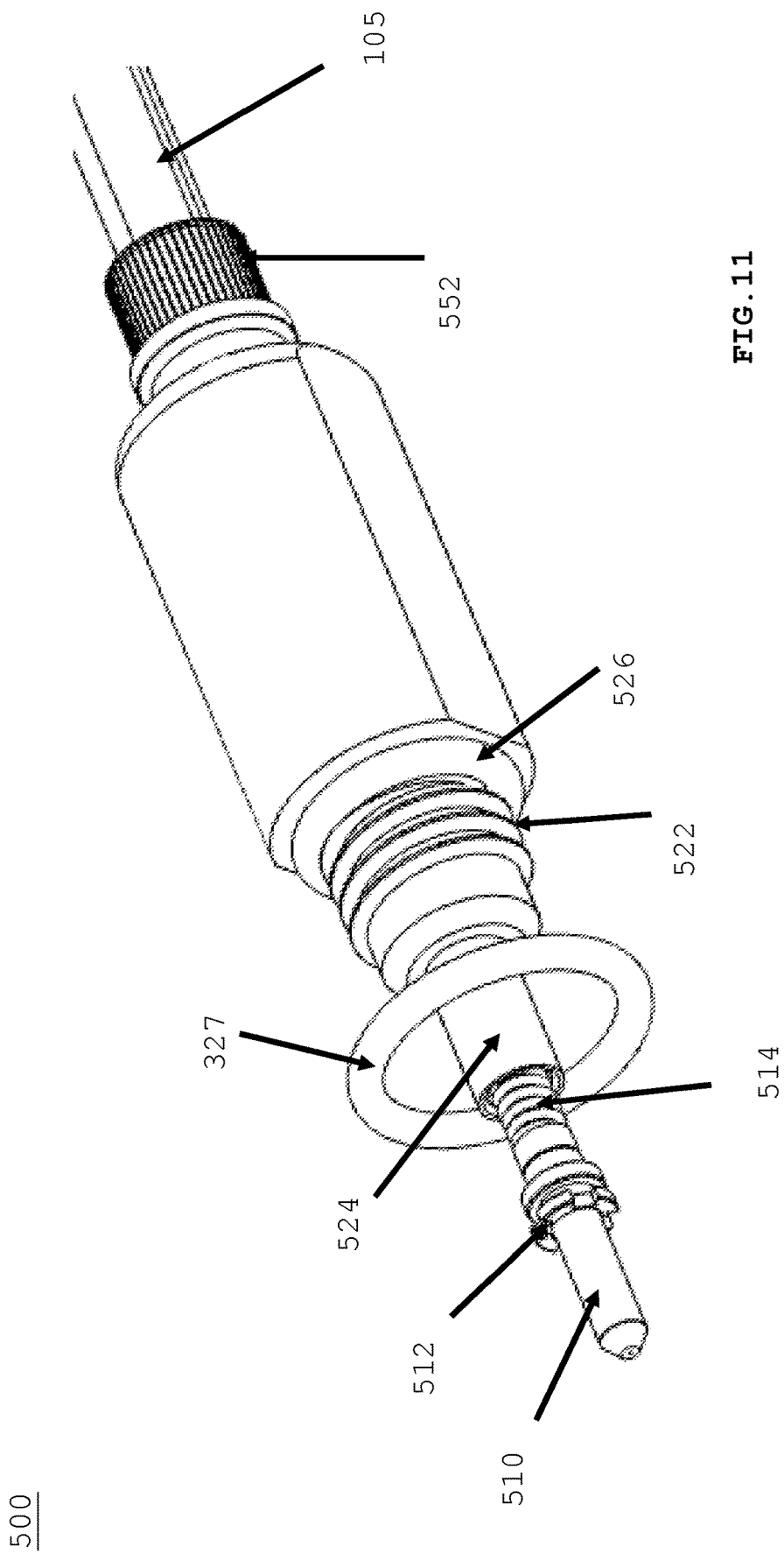
FIG. 11 is a perspective view of ruggedized back body with spring push and environmental seal.

FIG. 11 depicts ruggedized back body (500) further comprising a spring push (524) configured as a cup-shaped member to accept ferrule assembly (512) with a ferrule (510) secured to a proximal end thereof. Bias spring (514) is depicted compressed under the force of spring push (524), when back body (500) is secured to connector front body (300) via inner threads (329). Strength members (552) or Kevlar is positioned over crimp ring.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instance were a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An ingress protected outdoor connector comprising:
a connector outer body having a front end, a rear end configured to receive a fiber optic cable, an inner surface defining an interior cavity and comprising key on the inner surface and a threaded coupling on the inner surface spaced apart rearward of the key;
a ferrule assembly configured for reception into the cavity of the connector outer body, the ferrule assembly comprising a ferrule and a front flange projecting outwardly from the ferrule, the front flange defining a notch configured to receive the key for orienting the ferrule assembly within the connector outer body and preventing the ferrule assembly from rotating with respect to the connector outer body, the ferrule assembly further comprising a back flange, the back flange having a forward facing surface, the forward facing surface configured to engage the key to limit forward longitudinal movement of the ferrule assembly with respect to the connector outer body;
a connector back body threadably connected to the connector outer body by the threaded coupling on the inner surface;
a coupling nut free to float over the connector outer body and configured to secure the ingress protected connector to a mating element.

2. The ingress protected outdoor connector according to claim 1 wherein the key comprises a plurality of keys and the notch comprises a plurality of notches configured to receive the plurality of keys.

3. The ingress protected outdoor connector according to claim 2 wherein the keys are formed as one piece of material with the connector outer body.

4. The ingress protected outdoor connector according to claim 2 further comprising a spring biasing the notches of the ferrule assembly into engagement with the keys of the connector outer body.

5. The ingress protected outdoor connector according to claim 4 further comprising a spring push engaging the spring and providing a reaction surface for the spring to push the ferrule assembly.

6. The ingress protected outdoor connector according to claim 5 wherein the spring push is formed as one piece of material with the connector back body.

7. The ingress protected outdoor connector according to claim 6 wherein the spring push comprises a cup-shaped member at a proximal end of the connector back body.

8. The ingress protected connector according to claim 4, wherein the connector outer body comprises an alignment flat on the front end to mate the ingress protected connector within the mating element.

9. The ingress protected connector according to claim 1, further comprising a proximal seal and a distal seal to prevent environmental ingress of water, debris and other foreign substances.

10. The ingress protected connector according to claim 1, wherein the connector outer body further comprises a directional indicator for orienting the ingress protected connector into the adapter.

11. The ingress protected connector according to claim 1, further comprising a strain relief boot.

12. A dual flanged ferrule assembly comprising a body having a first end and a second end and a longitudinal passage extending from the first end to the second end, the longitudinal passage being configured to receive a ferrule therein such that the ferrule extends from the first end in a forward longitudinal direction, and the longitudinal passage being configured to receive at least one optical fiber therethrough passing into the ferrule, the body including a front flange and a back flange, the front flange being located closer to the first end of the body than the back flange, the front flange being formed to accept an alignment member such that the alignment member is passable longitudinally through the front flange, and the back flange having a forward facing surface, the forward facing surface is disposed to engage the alignment member to limit longitudinal movement between the ferrule assembly and a connector component.

13. The dual flanged ferrule assembly according to claim 12, wherein the back flange is configured to engage a spring for biasing the ferrule assembly in a forward direction thereby securing the alignment member with the first front flange.

14. The dual flanged ferrule assembly according to claim 12, wherein the body further comprises an alignment tube sized and shaped to accept an epoxy therein to seal the optical fiber with the alignment tube.

15. The dual flanged ferrule assembly according to claim 12, wherein the body further comprises a gap between the front flange and the back flange to accept a lengthwise portion of the alignment member.

16. The ingress protected connector according to claim 15, wherein the spring push has a shaft that accepts the bias spring.

17. An ingress protected outdoor connector, comprising:
a connector outer body having a front end, a rear end configured to receive a fiber optic cable, an inner surface defining an interior cavity and comprising a first alignment member on the inner surface, the front end of the connector body including a plug frame and a shroud around the plug frame, wherein the connector outer body is a single integrally molded piece of material;
a ferrule assembly configured for reception into the cavity of the connector outer body, the ferrule assembly comprising a ferrule and a flange projecting outwardly from the ferrule the alignment member engaging the ferrule assembly within the connector outer body and preventing the ferrule assembly from rotating with respect to the connector outer body;
a connector back body connected to the connector outer body; and
a coupling nut movable with respect to the connector outer body and configured to threadably mate with a mating element to secure the ingress protected connector to the mating element.

* * * * *